Dec. 3, 1929.  J. R. DAWSON  1,737,786
METHOD OF AND MEANS FOR REDUCING STRESSES IN WELDED PIPE
Filed Nov. 27, 1925

Inventor:
Joseph R Dawson,
By Byrnes Townsend & Breckenstein,
Attorneys

Patented Dec. 3, 1929

1,737,786

UNITED STATES PATENT OFFICE

JOSEPH R. DAWSON, OF FLUSHING, NEW YORK, ASSIGNOR TO THE LINDE AIR PRODUCTS COMPANY, A CORPORATION OF OHIO

METHOD OF AND MEANS FOR REDUCING STRESSES IN WELDED PIPE

Application filed November 27, 1925. Serial No. 71,789.

The invention relates to structures fabricated by welding together tubular metal members, and it comprises a method whereby the stresses produced in such structures under certain conditions may be diminished. The invention is particularly applicable in the construction of pipe lines for the transportation of oil and gas.

It is customary in laying pipe lines of the welded-joint type to first weld as many lengths or sections of pipe together as can be conveniently handled and then to join the long lengths of pipe to form a continuous line. As the initial short lengths or sections are welded together to form the long lengths at least one end of the pipe section which is being welded is free to move so that the contraction stresses that attend the cooling of the weld are relieved. The long lengths of pipe so produced are however of such length and weight that the friction between them and the supporting surface upon which they are positioned is sufficient to prevent endwise movement of the pipe to relieve the stresses produced by the contraction at the welds which are made for the purpose of joining these long lengths.

According to this invention it is proposed to reduce the stresses set up in welding the long lengths of pipe together by intentionally deforming the pipe near the end to be welded in such manner that when the weld upon cooling is subjected to tension the deformed portion adjacent to the weld will tend to assume its original shape, and in doing so the pipe will become somewhat elongated and thus diminish the tensile stress due to cooling.

The objects and novel features of the invention will be apparent from the following description taken with the accompanying drawing, in which.

Figure 1:
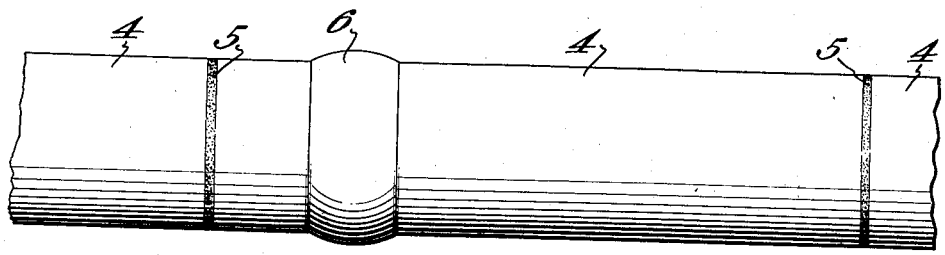
Fig. 1 is an elevation of a portion of a welded pipe line to which the invention has been applied.

Referring to Fig. 1 of the drawing, a pipe line constructed in accordance with the principles of this invention may consist of a plurality of sections 4 joined together by butt-welded joints 5. A pipe section 4 to which one of the final welds is to be made is deformed by rolling or pressing so as to slightly increase the diameter of the pipe at one point as shown for example at 6. When the weld cools and contraction occurs, the portion so deformed can become elongated with reduction of its diameter. If desired, the ends of both sections which are to be joined by one of the final welds may be deformed. The weld may be put under compression if desired by so adjusting the deformation of the pipe as to insure that the deformed portion of the pipe will still be of enlarged diameter after the weld has cooled, and then further reducing the diameter of the enlarged portion by hammering or the like.

Figure 2:
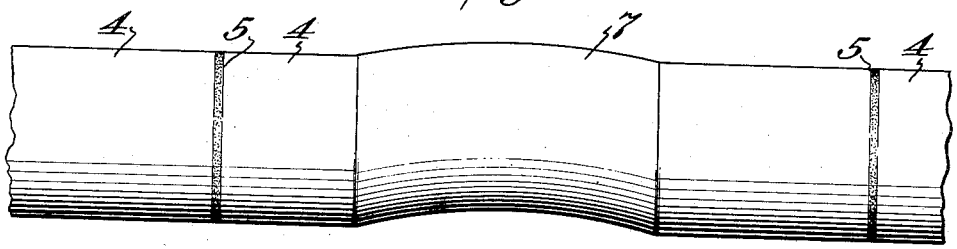
Figs. 2 and 3 are views similar to Fig. 1, but showing modifications of the invention.
Figure 3:
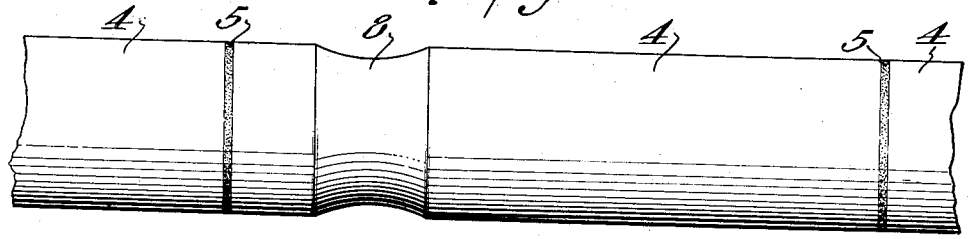

The advantages of the invention may be secured by deforming the pipe in other ways than that shown in Fig. 1. For example, the pipe may be given a slight bend at a point near the end to be welded as shown at 7 in Fig. 2, or the diameter of the pipe may be slightly decreased at a point adjacent such end, as shown at 8 in Fig. 3. Other forms of the invention will readily suggest themselves.

While the invention has been described with particular reference to oil and gas pipe lines, it is to be understood that it is also applicable in any situation where two pipe sections, which are fixed at their ends remote from the ends to be welded, are to be welded together.

I claim:

1. The method of reducing stresses in welded pipe lines due to contraction on cooling from the welding operation, which consists in so deforming the pipe near the end to be welded that the over-all length of the pipe is shortened, and permitting the deformed portion of the pipe to approximate its original shape as the pipe contracts on cooling from the welding operation.

2. The method of reducing stresses in welded pipe lines due to contraction on cooling from the welding operation, which consists in so changing the diameter of the pipe near the end to be welded that the over-all length of the pipe is shortened and permitting the deformed portion of the pipe to approximate its original diameter and length as the pipe contracts on cooling from the welding operation.

3. The method of putting welded pipe joints under compressive stresses, which comprises increasing the diameter of a portion of the pipe near the end to be welded and, after the welding operation, reducing the enlarged portion of the pipe to its original diameter.

4. A welded pipe line comprising a plurality of pipe sections welded together and having portions of the pipe adjacent certain of the welded joints deformed in such manner as to permit of a limited endwise movement of the section adjacent said deformed portion without creating undue tension stresses at the weld.

5. A welded pipe line comprising a plurality of pipe sections welded together, certain of said sections having enlarged portions adjacent the welded joints adapted to be reduced in diameter to put the welded joints under compression.

6. A pipe section for use in pipe lines and the like having a deformed portion adjacent one end adapted to permit of limited elongation of the pipe when subjected to endwise strains.

In testimony whereof, I affix my signature.

JOSEPH R. DAWSON.